United States Patent
Uchida et al.

(10) Patent No.: US 6,722,343 B2
(45) Date of Patent: Apr. 20, 2004

(54) KNOCK CONTROL DEVICE FOR AN INTERNAL COMBUSTION ENGINE

(75) Inventors: Toshio Uchida, Hyogo (JP); Yasuhiro Takahashi, Tokyo (JP); Koichi Okamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/396,318

(22) Filed: Mar. 26, 2003

(65) Prior Publication Data
US 2003/0183195 A1 Oct. 2, 2003

(30) Foreign Application Priority Data
Mar. 28, 2002 (JP) .......................... 2002-090993

(51) Int. Cl.[7] .................................................. F02P 5/00
(52) U.S. Cl. ............................. 123/406.33; 123/406.35
(58) Field of Search .................. 123/406.33, 406.34, 123/406.35, 406.21, 406.37

(56) References Cited

U.S. PATENT DOCUMENTS

| 4,800,100 A | * | 1/1989 | Herbots et al. ............. 427/527 |
| 6,234,146 B1 | | 5/2001 | Tanaya et al. |
| 6,298,823 B1 | | 10/2001 | Takahashi et al. |
| 6,311,672 B1 | * | 11/2001 | Morishita et al. ......... 123/406.36 |
| 6,360,586 B1 | * | 3/2002 | Morishita et al. .......... 73/35.08 |
| 6,611,145 B2 | * | 8/2003 | Lodise et al. ................ 324/378 |

* cited by examiner

*Primary Examiner*—John Kwon
(74) *Attorney, Agent, or Firm*—Sughrue Mion, PLLC

(57) ABSTRACT

Based on an ionic current intensity determined by ionic current intensity learning means for determining the ionic current intensity based on an output from an ionic current detection circuit, at least one of a comparison reference value of a comparison reference value setting means and a control parameter correction amount of control parameter correction request amount setting means is corrected, so that, even in a case where fuel is mixed with additives, and a case where a non-standard spark plug is mounted, the ionic current amount fluctuation is accurately determined even if the amplitude of a knock signal varies due to ionic current intensity fluctuation, and correction of the comparison reference value corresponding to the ionic current intensity, or correction of the control parameter, is performed, to thereby prevent erroneous control based on erroneous knock detection, and securely achieve an excellent knock detection status and knock control status.

10 Claims, 11 Drawing Sheets

FIG. 7

| rpm/Load | 100 | 150 | 200 | 300 | 350 |
|---|---|---|---|---|---|
| 1000 | 0.67 | 0.73 | 0.76 | 0.74 | 0.73 |
| 1250 | 0.78 | 0.88 | 0.89 | 0.88 | 0.87 |
| 1500 | 0.95 | 0.99 | 1.00 | 1.00 | 0.98 |
| 1750 | 1.02 | 1.10 | 1.10 | 1.09 | 1.10 |
| 2000 | 0.99 | 1.13 | 1.15 | 1.17 | 1.16 |

FIG. 10A

| IPAve | Ka |
|---|---|
| 7000 | 0.00 |
| 8000 | 0.00 |
| 9000 | 0.20 |
| 10000 | 0.40 |
| 11000 | 0.60 |
| 12000 | 0.80 |
| 13000 | 0.90 |
| 14000 | 1.00 |

FIG. 10B

| IPAve | Kb |
|---|---|
| 7000 | 0.00 |
| 8000 | 0.00 |
| 9000 | 0.20 |
| 10000 | 0.40 |
| 11000 | 0.60 |
| 12000 | 0.80 |
| 13000 | 0.90 |
| 14000 | 1.00 |

FIG. 11A

| IPDev | Ka |
|---|---|
| 600 | 0.00 |
| 800 | 0.00 |
| 1000 | 0.20 |
| 1200 | 0.40 |
| 1400 | 0.60 |
| 1600 | 0.80 |
| 1800 | 0.90 |
| 2000 | 1.00 |

FIG. 11B

| IPDev | Kb |
|---|---|
| 600 | 0.00 |
| 800 | 0.00 |
| 1000 | 0.20 |
| 1200 | 0.40 |
| 1400 | 0.60 |
| 1600 | 0.80 |
| 1800 | 0.90 |
| 2000 | 1.00 |

FIG. 12A

|      | 300  | 420  | 450  | 660  | 780  | 900  | 1050 |
|------|------|------|------|------|------|------|------|
| 1000 | 1.00 | 1.00 | 1.00 | 1.00 | 1.00 | 1.00 | 1.00 |
| 1500 | 1.50 | 1.50 | 1.50 | 1.00 | 1.00 | 1.00 | 1.00 |
| 2000 | 2.50 | 2.00 | 2.00 | 1.50 | 1.50 | 1.50 | 1.50 |
| 2500 | 3.00 | 2.50 | 2.00 | 1.50 | 1.50 | 1.50 | 1.50 |
| 3000 | 3.50 | 3.00 | 2.50 | 2.00 | 1.50 | 1.50 | 1.50 |
| 3500 | 4.00 | 3.50 | 3.00 | 2.00 | 1.50 | 1.50 | 1.50 |
| 4000 | 4.50 | 4.00 | 3.00 | 2.00 | 1.50 | 1.50 | 1.50 |
| 4500 | 5.00 | 4.00 | 3.00 | 2.00 | 1.50 | 1.50 | 1.50 |
| 5000 | 5.00 | 4.00 | 3.00 | 2.00 | 1.50 | 1.50 | 1.50 |
| 5500 | 5.00 | 4.00 | 3.00 | 2.00 | 1.50 | 1.50 | 1.50 |
| 6000 | 5.00 | 4.00 | 3.00 | 2.00 | 1.50 | 1.50 | 1.50 |
| 6500 | 5.00 | 4.00 | 3.00 | 2.00 | 1.50 | 1.50 | 1.50 |

FIG. 12B

|      | 300  | 420  | 450  | 660  | 780  | 900  | 1050 |
|------|------|------|------|------|------|------|------|
| 1000 | 2.00 | 2.00 | 2.00 | 2.00 | 2.00 | 2.00 | 2.00 |
| 1500 | 2.00 | 2.00 | 2.00 | 2.00 | 2.00 | 2.00 | 2.00 |
| 2000 | 2.50 | 2.00 | 2.50 | 2.50 | 2.50 | 2.50 | 2.50 |
| 2500 | 3.00 | 2.50 | 2.50 | 2.50 | 2.50 | 2.50 | 2.50 |
| 3000 | 3.50 | 3.00 | 3.00 | 3.00 | 3.00 | 2.50 | 2.50 |
| 3500 | 4.00 | 3.50 | 3.00 | 3.00 | 3.00 | 2.50 | 2.50 |
| 4000 | 5.00 | 4.50 | 3.50 | 3.50 | 3.00 | 2.50 | 2.50 |
| 4500 | 5.50 | 5.00 | 3.50 | 3.50 | 3.00 | 3.00 | 3.00 |
| 5000 | 5.50 | 5.00 | 4.00 | 3.50 | 3.00 | 3.00 | 3.00 |
| 5500 | 5.50 | 5.00 | 4.00 | 3.50 | 3.00 | 3.00 | 3.00 |
| 6000 | 5.50 | 5.00 | 4.00 | 3.50 | 3.00 | 3.00 | 3.00 |
| 6500 | 5.50 | 5.00 | 4.00 | 3.50 | 3.00 | 3.00 | 3.00 |

FIG. 13A

|      | 300  | 420  | 450  | 660  | 780  | 900  | 1050 |
|------|------|------|------|------|------|------|------|
| 1000 | 3.00 | 3.00 | 3.00 | 3.00 | 3.00 | 3.00 | 3.00 |
| 1500 | 2.00 | 2.00 | 2.00 | 2.00 | 2.00 | 2.00 | 2.00 |
| 2000 | 2.00 | 2.00 | 2.00 | 2.00 | 2.00 | 2.00 | 2.00 |
| 2500 | 2.00 | 2.00 | 2.00 | 2.00 | 2.00 | 2.00 | 2.00 |
| 3000 | 2.00 | 2.00 | 2.00 | 2.00 | 2.00 | 2.00 | 2.00 |
| 3500 | 2.00 | 2.00 | 2.00 | 2.00 | 2.00 | 2.00 | 2.00 |
| 4000 | 2.00 | 2.00 | 2.00 | 2.00 | 2.00 | 2.00 | 2.00 |
| 4500 | 2.00 | 2.00 | 2.00 | 2.00 | 2.00 | 2.00 | 2.00 |
| 5000 | 2.00 | 2.00 | 2.00 | 2.00 | 2.00 | 2.00 | 2.00 |
| 5500 | 2.00 | 2.00 | 2.00 | 2.00 | 2.00 | 2.00 | 2.00 |
| 6000 | 2.00 | 2.00 | 2.00 | 2.00 | 2.00 | 2.00 | 2.00 |
| 6500 | 2.00 | 2.00 | 2.00 | 2.00 | 2.00 | 2.00 | 2.00 |

FIG. 13B

|      | 300  | 420  | 450  | 660  | 780  | 900  | 1050 |
|------|------|------|------|------|------|------|------|
| 1000 | 2.00 | 2.00 | 2.00 | 2.00 | 2.00 | 2.00 | 2.00 |
| 1500 | 1.00 | 1.00 | 1.00 | 1.00 | 1.00 | 1.00 | 1.00 |
| 2000 | 1.00 | 1.00 | 1.00 | 1.00 | 1.00 | 1.00 | 1.00 |
| 2500 | 1.00 | 1.00 | 1.00 | 1.00 | 1.00 | 1.00 | 1.00 |
| 3000 | 1.00 | 1.00 | 1.00 | 1.00 | 1.00 | 1.00 | 1.00 |
| 3500 | 1.00 | 1.00 | 1.00 | 1.00 | 1.00 | 1.00 | 1.00 |
| 4000 | 0.75 | 0.75 | 1.00 | 1.00 | 1.00 | 1.00 | 1.00 |
| 4500 | 0.75 | 0.75 | 1.00 | 1.00 | 1.00 | 1.00 | 1.00 |
| 5000 | 0.75 | 0.75 | 1.00 | 1.00 | 1.00 | 1.00 | 1.00 |
| 5500 | 0.75 | 0.75 | 1.00 | 1.00 | 1.00 | 1.00 | 1.00 |
| 6000 | 0.75 | 0.75 | 1.00 | 1.00 | 1.00 | 1.00 | 1.00 |
| 6500 | 0.75 | 0.75 | 1.00 | 1.00 | 1.00 | 1.00 | 1.00 |

KNOCK CONTROL DEVICE FOR AN INTERNAL COMBUSTION ENGINE

BACKGROUND OF THE INVENTION

1. Field of the Invention

The present invention relates to a knock control device for an internal combustion engine, and more particularly to a knock control device for an internal combustion engine for detecting an occurrence of knocking in the internal combustion engine, based on an ionic current which is generated by combustion in the internal combustion engine, and correcting an internal combustion engine control amount so that the knocking is suppressed.

2. Description of the Related Art

Up to now, in knock control devices for an internal combustion engine, in order to minimize damage caused to the engine by the knock generation, a control amount of the internal engine is controlled so that the knocking is suppressed (e.g., ignition timing is retarded) in accordance with the knock generation.

Further, in an internal combustion engine knock control device for using an ionic current generated immediately after ignition inside a combustion chamber of the internal combustion engine, since there is little difference in knock detection sensitivity of each cylinder, knock control can be performed effectively for each cylinder. A variety of these have been proposed up to now.

Generally, in the internal combustion engine, air and fuel (an air-fuel mixture) introduced into the combustion chamber is compressed by a upward movement of a piston, and a high voltage is applied to a spark plug inside the combustion chamber to burn the air-fuel mixture with electrical sparks generated at the spark plug, whereby a force that pushes down the piston is taken out as an output.

At this time, when the combustion takes place inside the combustion chamber, electrons of molecules inside the combustion chamber dissociate (ionization). Therefore, when the high voltage is applied to the spark plug (an ionic current detection electrode) inside the combustion chamber, movement of ions through the spark plug allows an ionic current to flow.

It is known that the ionic current varies sensitively based on pressure fluctuation inside the combustion chamber, and the ionic current contains vibration components that correspond to the knock generation. Therefore, it is possible to determine the presence or absence of the knock generation based on the ionic current.

In such a type of device, in order to prevent erroneous knock detection due to noise superimposed in the ionic current, a background level is set regarding an ionic current detection signal. For example, in a device described in JP 10-9108 A mentioned above, a signal is generated by performing waveform shaping processing and the like on a knock current detection signal, and for the signal thus generated there is set a background level (a noise level determination reference) which is calculated from a sum produced by adding an average value of detection signal strength to a dead zone (an offset value) corresponding to an operating region.

However, the device described in JP 10-9108 A achieves the knock control based on the ionic current, but it is not provided with correction means for correcting the knock detection and the knock control in a case where additives are mixed into the fuel, and a case where a non-standard spark plug is mounted in the combustion chamber. Therefore, there has been a problem in that fluctuation in the intensity of the ionic current detection signals is likely to cause erroneous knock detection and non-detection.

In order to overcome this problem, JP 2001-82304 A describes a device which is a knock control system similar to the device described in the above-mentioned JP 10-9108 A, wherein fluctuation of the ionic current amounts is detected by performing processing to obtain an average value of integral values of the ionic currents, and then the learned result is used to correct the background level and the like to solve this problem.

Further, as a method of setting the correction amount, the result learned by performing the averaging processing is compared with a comparison level that is set based on R.P.M. and load, and a background level correction amount is set according to a ratio or the deviation between the result learned from the average processing and the comparison level.

As described above, JP 2001-82304 A proposes the device for performing knock control in correspondence with changes in the ionic current produced by the fuel and the spark plug, but the ionic current is known to change in amount depending on the engine R.P.M., the load and the like, which the device in this publication does not consider. When considering an actual vehicle operation time, it is also necessary to learn the conditions mentioned above, and thus it is necessary to shorten the cycle for obtaining the average in the conventional example in the above-mentioned publication. When the cycle for obtaining the average is long, the operating conditions are such that the low R.P.M. is relatively frequent until the learning is completed. Then, immediately before the learning is completed, high R.P.M. is reached, and then when the learning ends, the learned value in which a proportion of the low R.P.M. is large is compared with the comparison level that should be used for comparison at the high R.P.M. time. Therefore, there is a fear that an appropriate correction amount cannot be set.

Further, even when the above-mentioned engine conditions are identical, the ionic current amount is known to vary at each ignition cycle. As such, in the case where the average is simply taken as in the conventional example of the above-mentioned publication, the fluctuations of the ionic current amounts from each ignition cycle are reflected in the learned value, and the results of the learning might not be stable.

Further, the ionic current amount at the time of misfire is extremely small, and it is known to become zero. However, in the conventional example of the above-mentioned publication, there is no consideration given to the misfire time. In a case where the misfire is frequent, the integral values of the ionic currents at the time of the misfire are reflected in the learned value, and it is possible that the results of the learning might not be stable.

SUMMARY OF THE INVENTION

The present invention has been made to solve the above-mentioned problems, and therefore has as an object to provide a knock control device for an internal combustion engine for accurately detecting fluctuation in an ionic current amount, to cope with change in the ionic current amount.

A knock control device of the present invention for an internal combustion engine comprises: ionic current detection means for detecting an ionic current generated immediately after ignition in a combustion chamber of an internal combustion engine; knock detection means for extracting a knock signal from the ionic current; and knock determination means for determining a knock status of the internal combustion engine based on the extracted knock signal, wherein the knock determination means includes comparison reference value setting means for comparing the knock signal outputted from the knock detection means with a filter value which has undergone filter processing; and wherein the knock control device for the internal combustion engine further comprises: control parameter correction request amount setting means for setting a control parameter correction request amount for correcting a control parameter at least including a retardation correction amount for retarding ignition timing of each cylinder, based on the comparison reference value set by the comparison reference value setting means, and the knock signal outputted from the knock detection means; control parameter correction means for correcting a control parameter for controlling ignition timing of an ignition device, based on the control parameter correction request amount that has been set; ionic current intensity determination means for determining ionic current intensity of the ionic current based on an output value from the ionic current detection means; and correction means for correcting at least one of the comparison reference value and the control parameter correction request amount, based on the ionic current intensity determined by the ionic current intensity determination means.

BRIEF DESCRIPTION OF THE DRAWINGS

In the accompanying drawings:

FIG. 7 is an IPPLS correction coefficient Coef_IP map according to Embodiment 1 of the present invention;

FIGS. 10A and 10B are an offset correction coefficient Ka table and a Ki correction coefficient Kb table corresponding to an IPAve learned value according to Embodiment 1 of the present invention;

FIGS. 11A and 11B are an offset correction coefficient Ka table and a Ki correction coefficient Kb table corresponding to an IPDev learned value according to Embodiment 1 of the present invention;

FIGS. 12A and 12B are two offset maps corresponding to intensity/weakness of an ionic current according to Embodiment 1 of the present invention; and FIGS. 13A and 13B are two Ki maps corresponding to the intensity/weakness of the ionic current according to Embodiment 1 of the present invention.

DETAILED DESCRIPTION OF THE PREFERRED EMBODIMENTS

Embodiment 1

Figure 1:
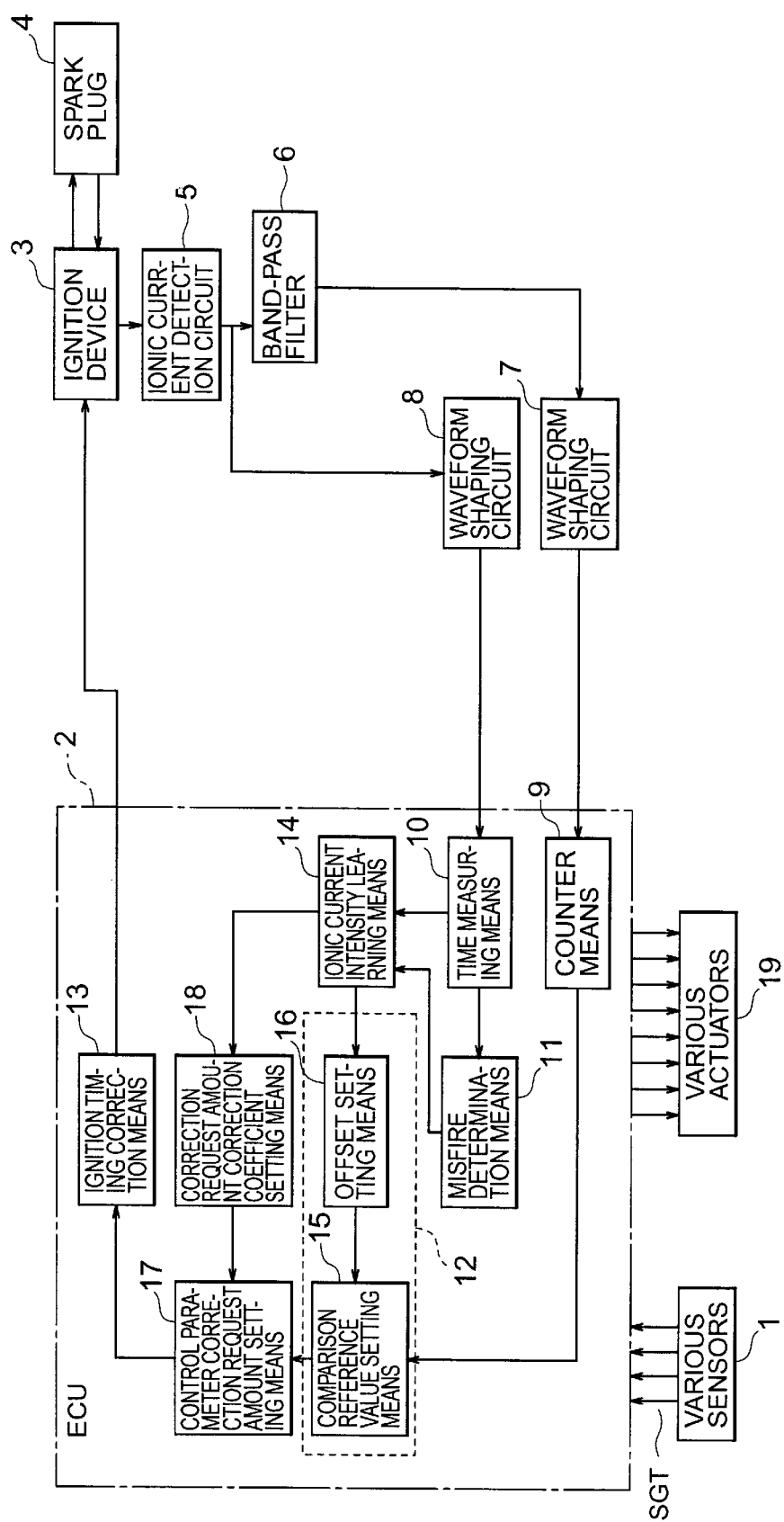
FIG. 1 is a block diagram illustrating a configuration of a knock control device for an internal combustion engine according to Embodiment 1 of the present invention.

FIG. 1 is a block diagram showing an outline of Embodiment 1 of the present invention. Description of this block diagram will be made below.

In FIG. 1, reference numeral 1 denotes various sensors, and reference numeral 2 denotes an ECU. The ECU 2 is constituted by a microcomputer. Further, in FIG. 1, only one spark plug is shown as a representative.

The various sensors 1 include a commonly known throttle opening-angle sensor, crank angle sensor, temperature sensor and the like for generating various sensor signals indicating an operational state of the internal combustion engine. For example, the crank angle sensor among these outputs a crank angle signal SGT corresponding to engine R.P.M. The various sensor signals including the crank angle signal SGT are inputted into the ECU 2 which is constituted by the microcomputer. The crank angle signal SGT has a pulse edge which indicates crank angle reference positions of each cylinder, and it is used in a variety of control calculations inside the ECU 2.

Reference numeral 3 denotes an ignition device. The ignition device 3 includes a spark coil having a primary winding and a secondary winding, and a power transistor for cutting off an electrical flow in the primary winding of the spark coil (neither is shown in the diagram).

Reference numeral 4 denotes a spark plug. The spark plug 4 generates sparks by means of a high voltage for ignition which is applied by the ignition device, to light the air-fuel mixture of each cylinder of the engine according to predetermined timing.

Reference numeral 5 denotes an ionic current detection circuit. The ionic current detection circuit 5 includes bias means (a condenser) for applying a bias voltage to the spark plug 4 via the spark coil inside the ignition device 3 in order to detect the ionic current flowing between gaps of the spark plugs 4 at the combustion time, and a resistor for outputting the ionic current detection signal (neither is shown in the diagram).

Reference numeral 6 denotes a band-pass filter. The band-pass filter 6 includes an amplification circuit, and it extracts an amplified knock signal from the ionic current detection signal outputted from the ionic current detection circuit 5. Reference numeral 7 denotes a waveform shaping circuit. The waveform shaping circuit 7 outputs a knock pulse array of waves produced by shaping the knock signals into given levels. Further, reference numeral 9 denotes counter means. The counter means 9 counts the number of pulses of the knock pulse array outputted from the waveform shaping circuit 7. The ECU 2 performs a knock determination based on the number of pulses of the knock pulse array after the knock signal extracted from the ionic current detection signal has undergone the waveform shaping, which is obtained by means of the band-pass filter 6, the waveform shaping circuit 7 and the counter means 9.

Reference numeral 8 denotes another waveform shaping circuit, which is composed of a DC thresh and a timer, and which shapes the waveform of the ionic current detection signal outputted from the ionic current detection circuit 5, so as to output a pulse (hereinafter, referred to as the "IPPLS") that represents an ionic current generation time (time duration during which the ionic current is generated) and also serves as an index of the ionic current intensity. Reference numeral 10 denotes time measuring means. The time measuring means 10 digitizes the IPPLS (the ionic current generation time) inputted from the waveform shaping circuit 8.

In addition to the counter 9 and the time measuring means 10, the ECU 2 includes the following, as shown in FIG. 1, which are explained below: misfire determination means 11, knock determination means 12, ignition timing correction means 13, ionic current intensity learning means 14, control parameter correction request amount setting means 17 and correction request amount correction coefficient setting means 18. These will now be explained.

If the IPPLS digitized by the time measuring means 10 is equal to or below a given value, the misfire determination means 11 determines that the ionic current has not been generated yet, which is to say that the misfire is determined. If the IPPLS is greater than the given value, then it determines ionic current generation, which is to say that combustion is determined. Note that, while not shown in the diagram, the misfire determination means 11 may also have smoldering detection means for determining that a leak current has been generated by smoldering and the like by the spark plug 4 at a time when, within given operating conditions, the IPPLS exhibiting a certain level or more above the given value continues for a given number of ignition times.

As shown in FIG. 1, the knock determination means 12 is provided with offset setting means 16 for setting the offset value, and comparison reference value setting means 15 for calculating a knock level average value AVE from the number of knock pulses counted by the counter means 9, and calculating a background level BGL obtained by adding the offset value set by the offset setting means 16 to the knock level average value AVE. When the number of knock pulses counted by the counter means 9 exceeds the background level BGL, the knock determination means 12 outputs a comparison result indicating the knock generation. Note that the offset setting means will be described later.

The ignition timing (control parameter) correction means 13 is connected to the control parameter correction request amount setting means 17, which, in the case where the comparison result indicating the knock generation is inputted from the knock determination means 12, calculates a retardation correction amount for retarding the ignition timing (to suppress the knock). Further, the ignition timing (control parameter) correction means 13 obtains a correction request variable serving as a reference from a correction request amount table corresponding to the number of knock pulses that exceeds the background level BGL, multiplies this amount by a correction coefficient Ki which is set by the correction request amount correction coefficient setting means 18, and then references a correction amount from the previous ignition control time to calculate the correction amount. On the other hand, in the case where a comparison result indicating that the knock has not yet occurred is inputted from the knock determination means 12, the ignition timing (control parameter) correction means 13 calculates an acceleration correction amount to accelerate the ignition timing. Note that the correction request amount correction coefficient setting means 18 will be described later.

The ionic current intensity learning means 14 performs learning calculation processing on the inputted IPPLS which has been digitized by the time measuring means 10, and calculates a statistical ionic current intensity based on a predetermined learning calculation formula. Note that, the ionic current intensity learning means 14 determines the ionic current intensity based on at least one of the integral value, a peak value and the generation time (the time duration during which the ionic current is generated) of the ionic current.

Further, the ionic current intensity learning means 14 has learning approval means (not shown in the diagram) for restricting the operating conditions (for example, the engine R.P.M., the load, an engine water temperature, an intake air temperature, the retardation amount, etc.) for performing the learning calculation processing described above, and IPPLS correction means (not shown in the diagram) for correcting the IPPLS based on the R.P.M. and the load.

The offset setting means 16 has a two offset maps based on the engine R.P.M. and on the load corresponding to the intensity/weakness of the ionic current.

The offset setting means 16 sets the offset value either by obtaining it from one of the two offset maps, or by adding a value that is between two values taken from the two maps, based on the learning calculation result (the statistical ionic current intensity) from the ionic current intensity learning means 14. The offset value that is set here is added to the knock level average value AVE to obtain the background level BGL.

The correction request amount correction coefficient setting means 18 has two correction request amount correction coefficient Ki maps which correspond to the intensity/weakness of the ionic current and are based on the engine R.P.M. and the load.

The correction request amount correction coefficient setting means 18 sets the correction request amount correction coefficient Ki either by obtaining it from one of the two correction request amount correction coefficient Ki maps, or by adding a value that is between the two values in the maps, based on the learning calculation result (the statistical ionic current intensity) from the ionic current intensity learning means 14. The correction request amount correction coefficient Ki which is set here is multiplied by the retardation control amount.

The various sensors 1, which include the crank angle sensor, input into the ECU 2 various information such as temperature information indicating the operation status of the engine. Various actuators 19 connected to the ECU 2 drive these based on control signals from the ECU 2, which correspond to the operating state.

Note that, although not shown here, among the ECU 2, the ignition device 3, the various sensors 1 and the various actuators 19, there are inserted an input/output interface, a D/A converter and an A/D converter.

Next, a block diagram shown in FIG. 1 will be used to describe operation according to Embodiment 1. When an ignition signal generated by the ECU 2 is inputted, a high voltage generated from the ignition device 3 is applied to the spark plug 4 and a discharge occurs in the gaps between the spark plugs 4, whereby the air-fuel mixture inside the engine cylinders is lighted.

When this occurs, the ionic current detection circuit 5 is charged with part of the ignition energy as the bias voltage therein. This bias voltage is applied to the spark plug 4 via the ignition device 3, whereby moving the ions generated at the air-fuel mixture combustion time to allow the ionic current to flow.

The ionic current is detected by the ionic current detection circuit 5 as the ionic current detection signal. On the one hand, the knock signal is extracted by means of the bandpass filter 6, the waveform shaping circuit 7 and the counter 9, to produce the number of knock pulses. On the other hand, the waveform shaping circuit 8 and the time measuring means 10 turn this into the above-mentioned IIPLS indicating the time duration of the ionic current (the ionic current intensity) based on the ionic current detection signal detected by the ionic current detection circuit 5. Then, the number of knock pulses and the IPPLS are inputted into the ECU 2, respectively.

Figure 2:
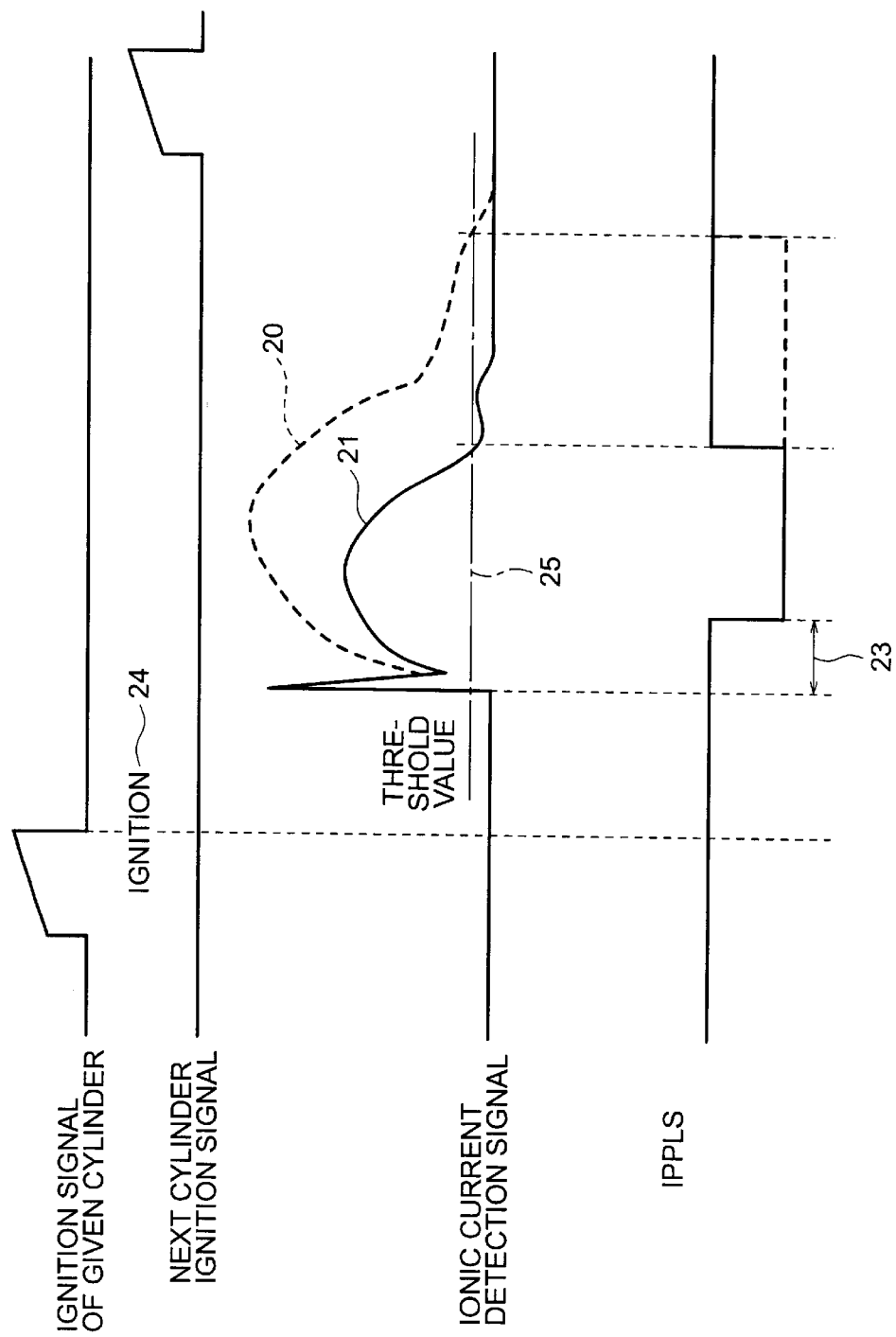
FIG. 2 is an explanatory diagram relating to an ionic current generation time during low rotation according to Embodiment 1 of the present invention.

FIG. 2 compares a difference in the ionic current intensity during the low R.P.M. time produced by mixing gasoline additives and the like. In FIG. 2, reference numeral 20 denotes a time when the ionic current intensity is great, and reference numeral 21 denotes a time when the ionic current intensity is small. Further, reference numeral 23 denotes a mask period for preventing erroneous pulsing caused by spark noise, reference numeral 24 denotes the ignition timing, and reference numeral 25 denotes a threshold value set for the ionic current detection signal. As shown in the diagram, for example, when using fuel mixed with additives, ions included in the additives are added to the ionic current, and thus the ionic current becomes larger than in the case without the additives, and the ionic current ionic current generation time becomes longer as well. Accordingly, the IPPLS generated by the waveform shaping circuit 8 also becomes longer.

Figure 3:
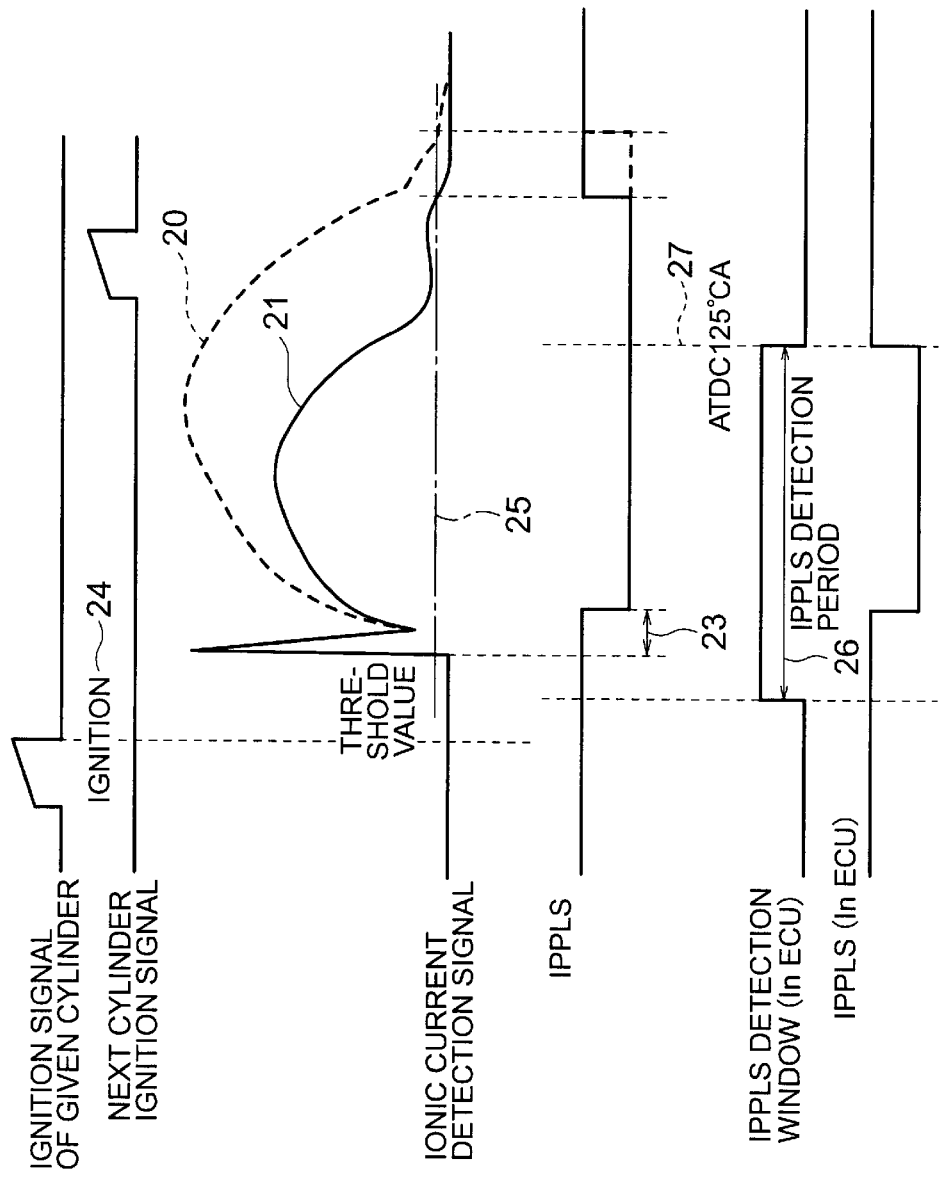
FIG. 3 is an explanatory diagram relating to the ionic current generation time during high rotation according to Embodiment 1 of the present invention.

FIG. 3 compares a difference in the ionic current intensity during the high R.P.M. time due to mixing in the gasoline additives and the like. Reference numerals 20, 21, 23, 24 and 25 are the same as in FIG. 2. Reference numeral 26 indicates an MF signal detection period, and reference numeral 27 indicates an ATDC 125° CA period. During the low R.P.M. shown in FIG. 2, the ionic current tends to easily exhibit variation in its duration of continuity depending on the intensity/weakness of the ionic current, and during the high R.P.M. shown in FIG. 3, it tends not to exhibit the difference (however, during the high R.P.M., a difference in the intensity/weakness of the ionic current peak appears easily) Further, during the high R.P.M., even in the case without the additives, the ionic current continues until the subsequent stroke. When the period during which the ECU 2 takes the IPPLS (for example, here it is from the ignition timing (reference numeral 24) until the ATDC 125° CA (reference numeral 27)) is restricted, the IPPLS during the IPPLS detection period hits an upper limit and becomes a fixed value regardless of the intensity/weakness of the ionic current, thereby making it difficult to determine the ionic current intensity. There are other cases, too, where a fixed, steady ionic current cannot be detected due to the ignition timing, the water temperature, the intake air temperature and the like, and there is a possibility of causing an erroneous determination. Due to the reasons explained above, this problem can be solved by limiting the operating condition that are used in the calculations for learning the IPPLS.

Further, in cases where the IPPLS is extremely small during the misfire, there is a possibility of causing an erroneous determination of the ionic current intensity. Therefore, when such cases are detected, the learning calculations are not performed for those combustion cycles. Further, although not particularly described in Embodiment 1, when the spark plug 4 is smoldering, the leakage current causes the IPPLS to become extraordinarily large, and there is a fear of causing an erroneous determination of the ionic current intensity. Therefore, the smoldering detection means is added, and it goes without saying that when the smoldering is detected, the learning calculation is not performed.

The misfire determination means 11 determines the misfire if the inputted IPPLS is below a given value, and it determines the combustion if it is above the given value. At the time of a combustion cycle where the misfire was determined, +1 is added to the misfire times counter (that is, 1 is added). When the value of the misfire times counter exceeds a given value within a given time duration or during a given ignition, an abnormal signal telling an operator that there is some sort of abnormality in the ignition system is outputted. However, in the case of fuel cuts or ignition cuts that are necessary for engine control (for example, during deceleration), these are determined as such and the misfire counter value is not increased.

Figure 4:
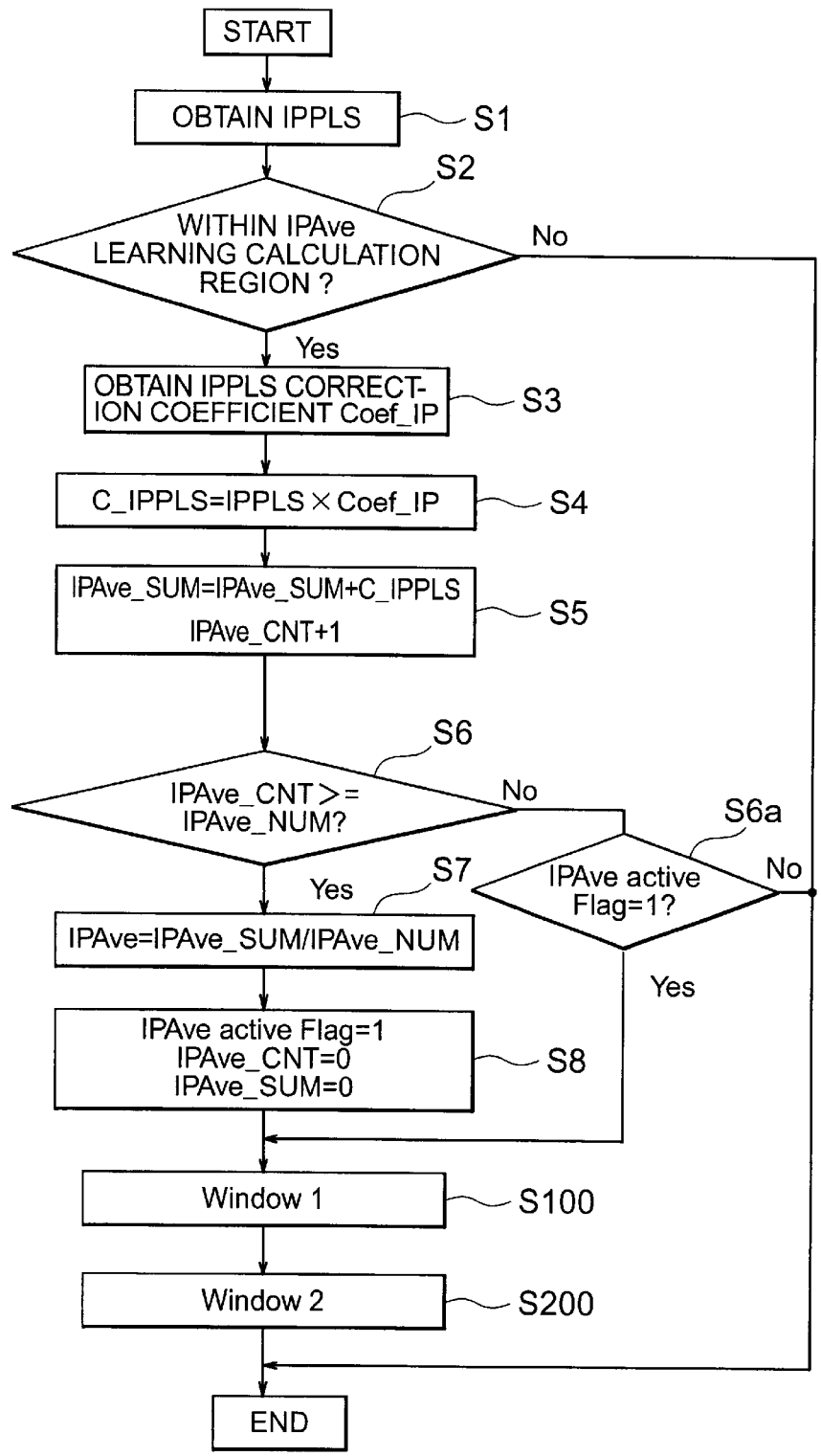
FIG. 4 is a flowchart relating to an IPPLS learning calculation according to Embodiment 1 of the present invention.
Figure 5:
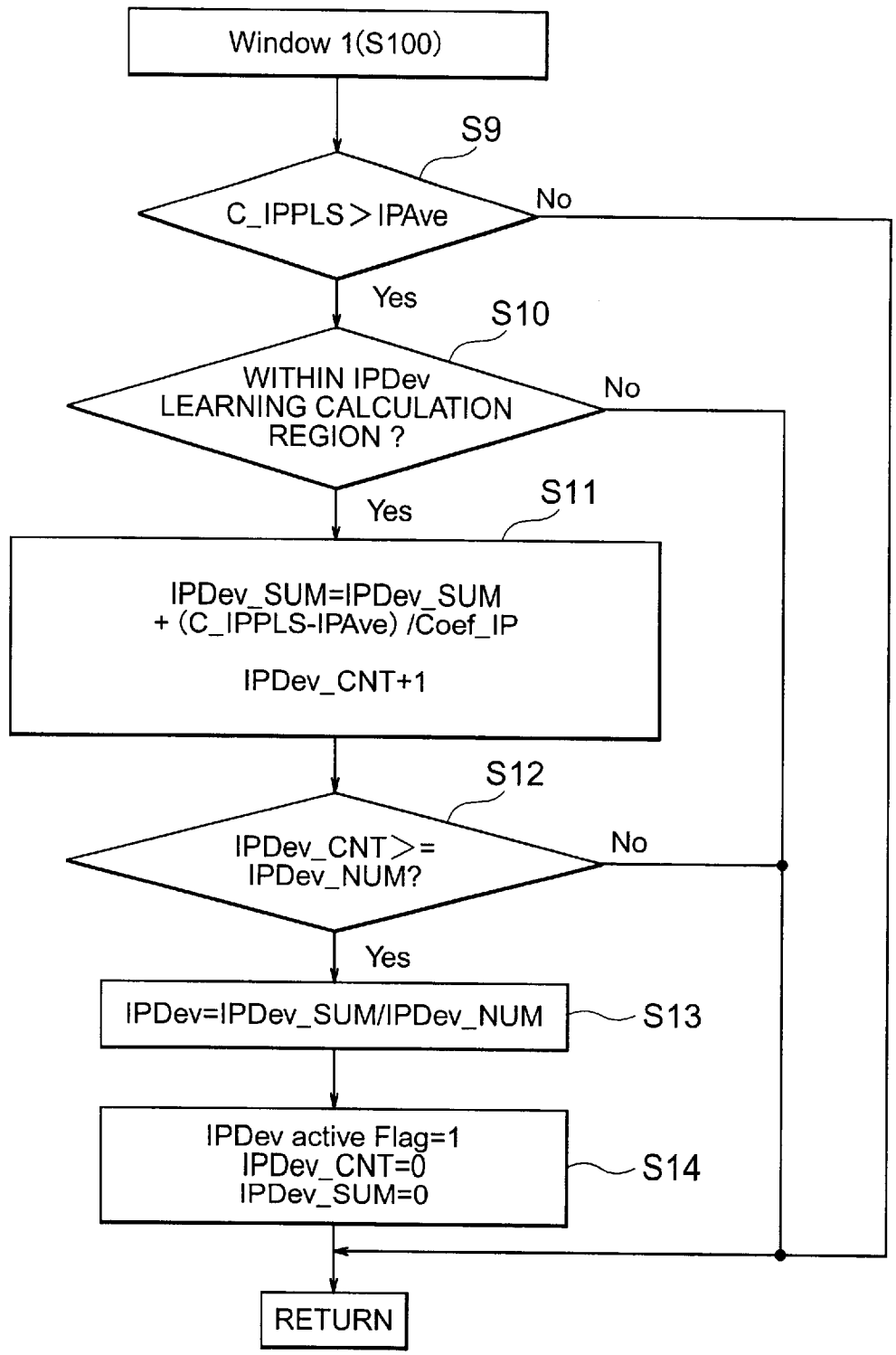
FIG. 5 is a flow chart relating to positive deviation IPDev with respect to an average value IPAve of the IPPLS according to Embodiment 1 of the present invention.
Figure 6:
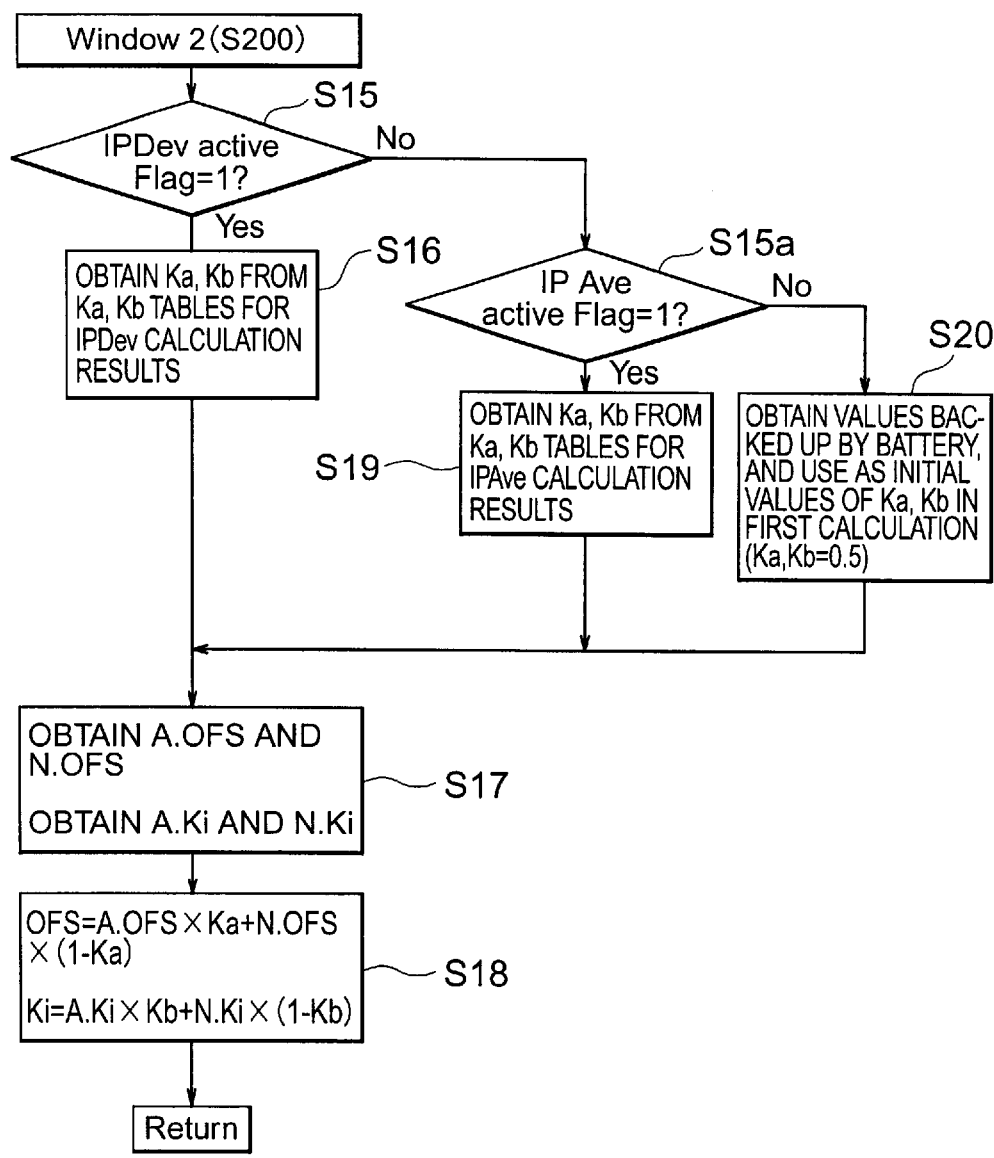
FIG. 6 is a flow chart relating to a control parameter correction according to Embodiment 1 of the present invention.

Next, the learning calculation processing is performed on the IPPLS, and the statistical ionic current intensity is obtained from the result thereof. Then, processing to obtain the offset value and the correction request amount correction coefficient Ki which correspond to the ionic current intensity is started. FIGS. 4 to 6 illustrate flow charts of this processing. Hereinafter, explanation will be made based on FIGS. 1 and 4 to 6.

Note that, in accordance with this embodiment, two learning calculation formulae are used to determine the ionic current intensity. Here, the average value IPAve of the IPPLS during the given ignition and the positive deviation IPDev during the given ignition with respect to the IPAve of that ignition are obtained.

In the average value IPAve during the given ignition, even when the range of the learning approval condition is broad, the value corresponding to the ionic current intensity tends to exhibit little deviation, but the differences produced depending on the intensity/weakness of ionic current are not large.

In contrast, the positive deviation IPDev during the given ignition exhibits a great difference in the calculation result produced with respect to the intensity/weakness of the ionic current, and thus it is superior for determining the intensity/weakness of the ionic current. However, this value deviates depending on the operating conditions, and there are operating conditions under which the determination of the intensity/weakness is difficult. Therefore, the range has been narrowed down even more than in the case of the learning approval conditions for the average value IPAve.

Accordingly, the learning completion time according to each calculation formula has a short learning time for the IPAve, and a long learning time for the IPDev. Therefore, when the IPAve learning is completed, the ionic current intensity is determined using the IPAve calculation result, and when the IPDev learning is completed, the intensity is determined after that with the IPDev calculation result.

First, at step S1 shown in FIG. 4, the IPPLS of the combustion cycle is obtained. At step S2, it is determined whether or not the learning approval conditions are satisfied as described above (here, the conditions are restricted to the engine R.P.M., the load, the engine water temperature, the intake air temperature, the retardation amount, and the like), and it is also determined whether or not the misfire is occurring. If even one of the conditions is not satisfied, the learning is not performed and the processing performed within the current ignition cycle is ended. In the case where it is determined that all the learning approval conditions are satisfied, the process advances to step S3, where an IPPLS correction coefficient Coef_IP based on the R.P.M. and the load, such as the one shown in FIG. 7, is obtained in order to use the inputted IPPLS in the learning calculation, and at step S4 this is multiplied by the IPPLS. Detailed explanation regarding this will be made later.

Figure 8:
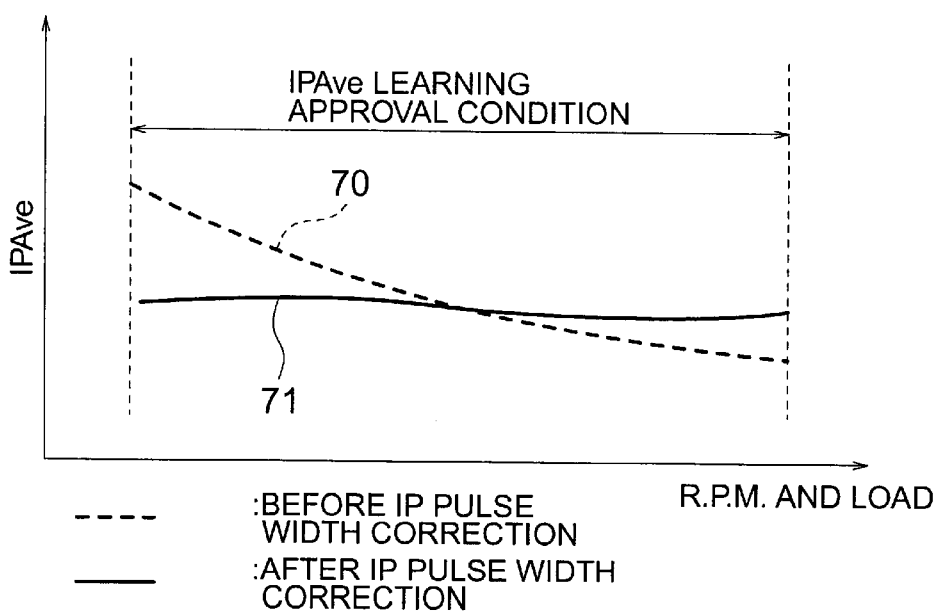
FIG. 8 is a diagram of an R.P.M./load characteristic exhibited by the IPPLS average value IPAve according to Embodiment 1 of the present invention.

The generation time of the ionic current varies depending on the R.P.M. and the load. Therefore, the IPPLS and the IPPLS average value IPAve also vary to some degree depending on the R.P.M. and the load. (This is shown in FIG. 8. In FIG. 8, reference numeral 70 indicates the case before an IP pulse width correction, and reference numeral 71 indicates the case after the IP pulse width correction.) This is the same within the learning approval conditions as well. (If the learning approval conditions are extremely narrow measures can be taken, but this causes the learning time to become extremely long and influences the ability to determine the knock.) Therefore, if the IPPLS within the learning approval conditions is not smoothed out by the IPPLS correction, the operating conditions which are learned will cause deviation in the learned value (here it is the IPAve), and this can cause erroneous determination of the intensity/weakness of the ionic current.

At step S5, in order to obtain a total sum IPAve_SUM of corrected IP pulse widths C_IPPLS, the C_IPPLSs that are inputted with each combustion cycle are added up, and an IPAve calculation counter IPA_CNT is increased by +1. At step S6, a determination is made as to whether or not the number of cycles IPAve_NUM that is necessary in order to obtain the IPAve has been reached. If it has been reached, the process advances to step S7. If it has not been reached, then at step S6 it is confirmed whether an IPAve learning completion flag IPAve active Flag is currently turned on. If the flag is turned on, that is, if the IPAve calculation has completed, the processing advances to Window 1 (in the flow chart in FIG. 5). If the IPAve calculation has not completed, then the processing for the present ignition cycle ends.

At step S6, if the IPAve calculation counter IPA_CNT reaches the number of combustion cycles IPAve_NUM, then at step S7 the total sum IPAve_SUM of the IP pulse widths C_IPPLS is divided by the number of combustion cycles IPAve_NUM to obtain the average value IPAve of the IPPLS within the given number of combustion cycles. Then, at step S8, the IPAve Flag indicating that the IPAve learning calculation has completed is set to 1, the IPAve_CNT and the IPAve_SUM are initialized (reset to 0), and then the process moves to the processing in Window 1. As described above, the ionic current intensity learning means raises the ionic current intensity per ignition cycle, and the total sum of the ionic current intensities during the given ignition cycles is divided by the given ignition cycles to obtain the average.

As shown in FIG. 5, in Window 1, the calculation for the IPDev (the positive deviation with respect to the IPAve) is performed. First, at step S9, it is determined whether the C_IPPLS of the current combustion cycle is greater than the IPAve. In the case where it is less than the IPAve, the process exits the processing in Window 1 and moves to Window 2. In the case where it is greater than the IPAve, the process advances to step S10.

Figure 9:
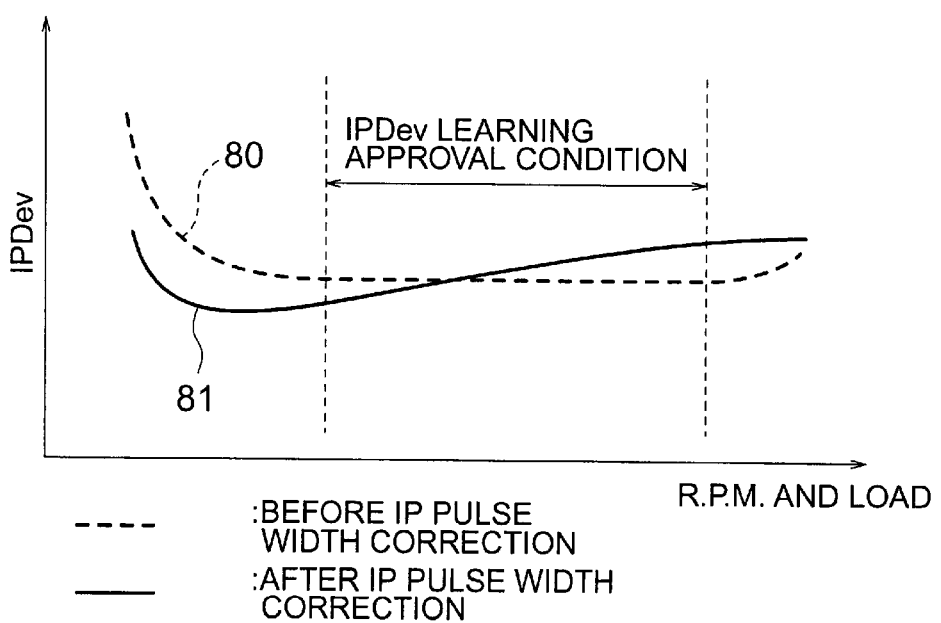
FIG. 9 is a diagram of an R.P.M./load characteristic exhibited by the positive deviation with respect to the IPPLS average value IPAve according to Embodiment 1 of the present invention.

At step S10, it is determined whether or not the current operating region is within an IPDev learning region. For this determination, the R.P.M. and the load are determined. The IPDev does not exhibit a linear characteristic determined by the R.P.M. and the load as the IPAve does. However, as shown in FIG. 9, the IPDev exhibits a tendency such that when the operating region is restricted further, the IPDev exhibits a substantially stable value without the IPPLS correction. Note that, in FIG. 9, reference numeral 80 denotes the case before the IP pulse width correction, and reference numeral 81 denotes the case after the IP pulse width correction. However, when the IPPLS correction is performed, the R.P.M. and the load characteristics are incorporated, and the value exhibits deviation due to the learned operating conditions. Thus, there may be cases where this causes erroneous determination of the intensity/weakness of the ionic current. In the case where the operating conditions are outside the IPDev learning region, the process exits the processing shown in Window 1 and moves to Window 2. In the case where the operating conditions are within the IPDev learning region, the process advances to step S11, and the processing for performing the IPDev calculation is performed.

In the processing in Window 1 shown in FIG. 5, at step S10, when it is determined that the current operating conditions satisfy the IPDev learning approval conditions, at step S11, the IPAve is subtracted from the C_IPPLSs inputted upon each ignition in order to obtain the C_IPPLS positive deviation with respect to the IPAve. Then, as described in the previous paragraph, the amount used in the division by the IPPLS correction coefficient Coef_IP is added to the IPDev_SUM (initial value 0) to eliminate the R.P.M. and the load characteristics, and the counter IPDev_CNT for calculating the IPDev is increased by +1. Next, at step S12, it is determined whether or not the number of combustion cycles IPDev_NUM that is necessary to obtain the IPDev has been reached. If the number has been reached, at step S13 the IPDev calculation is performed, and if it has not been reached, the processing in Window 1 ends and the process moves to the processing in Window 2.

At step S13, the IPDev_SUM is divided by the IPDev_NUM to obtain the IPDev during the given number of ignition times. Then, at step S14, the IPDev Flag for indicating that the IPDev learning calculation has ended is set to 1, the IPDev_CNT and the IPDev_SUM are initialized (set to 0), the processing in Window 1 ends, and the process moves to the processing in Window 2.

In the processing in Window 2 shown in FIG. 6, it is determined whether or not each of the learning calculations has been completed. If the learning is complete, the offset value correction coefficient Ka and the Ki correction coefficient Kb are obtained based on the learned value to correct the offset value and the Ki.

First, at step S15 the status of the IPDev active Flag is confirmed, and if the IPDev learning is completed (i.e., IPDev Flag=1), the process advances to step S16, and the offset correction coefficient Ka and the Ki correction coefficient Kb are obtained respectively from (a) an offset correction coefficient table corresponding to the IPDev learned value and from (b) a Ki correction coefficient table corresponding to the IPDev learned value, such as are shown in FIGS. 10A and 10B.

If the IPDev learning has not ended (i.e., IPDev Flag=0), the process advances to step S15a and the status of the IPAve Flag is confirmed. If the IPAve learning has ended (i.e., IPAve Flag=1), the process advances to step S19, and offset value correction coefficient Ka and the Ki correction coefficient Kb are obtained respectively from (a) an offset correction coefficient table corresponding to the IPAve learned value, and from (b) a Ki correction coefficient table corresponding to the IPAve learned value, such as are shown in FIGS. 11A and 11B.

Embodiment 1 has the two offset maps (FIGS. 12A and 12B) and the two Ki maps (FIGS. 13A and 13B), which are set according to the intensity/weakness of the ionic current. Based on the R.P.M. and the load, the offset value and the Ki value are obtained respectively from the two maps depending on whether the ionic current intensity is great or small.

At step S17, the calculation of the offset value is performed as follows: (the value A.OFS obtained from the map for great ionic current intensity)×(the value Ka obtained from the offset correction coefficient table)+(the value N.OFS obtained from the offset map for small ionic current intensity)×(1−Ka). That is, depending on the value of the offset correction coefficient Ka, it is determined whether to obtain the offset value from the offset map for great or small ionic current intensity, or to take a value between values obtained from both maps.

At step S18, the Ki calculation is performed as follows: (the value A.Ki obtained from the Ki map for great ionic current intensity)×(the value Kb obtained from the Ki correction coefficient table)+(the value N.Ki obtained form the Ki map for small ionic current intensity)×(1−Kb). That is, similarly to the offset value calculation, depending on the value of the value of Kb, it is determined whether to obtain the Ki value from the Ki map for great or for small ionic current intensity, or to take a value between values obtained from both maps.

At step S15a, if it is determined that the IPAve learning has not ended (i.e., IPAve Flag=0), the process advances to step S20, and the Ka and the Kb obtain initial values. Note that, the Ka and the Kb are backed up by a battery when the engine is stopped, and when the engine restarts, the values that were backed up by the battery are used as the initial values. Accordingly, the offset value and the Ki value immediately after the engine starts can have the values from immediately before the engine was stopped the previous time.

The offset value which has been set in the preceding manner is used to perform the knock determination as described above. Then, based on the knock determination result, the Ki value that is set as described above is used to set the retardation correction amount.

As described above, in accordance with Embodiment 1, based on the ionic current intensity determined by the ionic current intensity learning means 14 which determines the ionic current intensity based on the output from the ionic current detection circuit 5, at least one of the comparison reference value and the control parameter correction amount is corrected, so that, in the case where the additives containing an easily ionized substance is mixed into the fuel, the fluctuation of the ionic current amount can be determined with a high level of precision also in the case where the amplification of the knock signal varies due to the fluctuation of the ionic current intensity, whereby the comparison reference value corresponding to the ionic current intensity is corrected, or the correction of the control parameter is performed, the erroneous control based on erroneous determination of the knock is prevented, and an excellent knock detection status and knock control status can be securely achieved.

Note that, in accordance with Embodiment 1, the learning approval conditions are set based on the average value and the deviation regarding the ionic current intensity, and then the learning calculation is performed. The learning calculation formula may be only one. Furthermore, it goes without saying that additional learning calculation formulae and the learning approval conditions may be added.

Further, a result which is produced at least by adding or multiplying several learning calculation results, or by adding fractions of the results from each of such calculations, may be used for the final learning calculation result.

Further, the offset map and the correction request amount correction coefficient maps are configured having the two maps for the large and the small ionic current intensities. However, the number of maps may be increased.

Further, the offset map and the correction request amount correction coefficient map are configured having the two maps for the large and the small ionic current intensities, but they may be configured having a map serving as a reference, and the correction coefficient based on the result from the calculation for learning the ionic current intensity may be multiplied by a value from the map.

Further, it is also possible to directly correct the knock level average value and the control parameter correction request amount based on the ionic current intensity learning calculation result.

Further, the offset and the ignition timing were corrected based on the result of the calculation for learning the ionic current intensity, but the band-pass filter gain may be corrected based on the ionic current intensity learning result.

Further, in FIG. 1, for simplicity, the circuitry structure for only one cylinder was shown. However, in a multi-cylinder engine, the same control means may be provided to each cylinder, to determine the ionic current intensity of each cylinder and correct the control parameter for each cylinder.

Further, it goes without saying that the IPPLS from all the cylinders may be taken to learn an overall ionic current intensity.

Further, it goes without saying that the ionic current intensity can also be applied to cylinder distinguishing and the like.

Further, the learning times numbers IPAve_NUM and IPDev_NUM may be small values immediately after the engine starts, in order to allow the learning to end quickly. Then, after the first learning is completed, a processing may be performed to increase the learning times number in order to stabilize the learned value.

The present invention relates to a knock control device for an internal combustion engine, comprising: ionic current detection means for detecting an ionic current generated immediately after ignition in a combustion chamber of an internal combustion engine; knock detection means for extracting a knock signal from the ionic current; and knock determination means for determining the knock status of the internal combustion engine based on the extracted knock signal, in which the knock determination means includes comparison reference value setting means for comparing the knock signal outputted from the knock detection means with a filter value which has undergone filter processing; and in which the knock control device for the internal combustion engine further comprises: control parameter correction request amount setting means for setting a control parameter correction request amount for correcting a control parameter at least including a retardation correction amount for retarding ignition timing of each cylinder, based on the comparison reference value set by the comparison reference value setting means, and the knock signal outputted from the knock detection means; control parameter correction means for correcting a control parameter for controlling ignition timing of an ignition device, based on the control parameter correction request amount that has been set; ionic current intensity determination means for determining ionic current intensity of the ionic current based on an output value from the ionic current detection means; and correction means for correcting at least one of the comparison reference value and the control parameter correction request amount, based on the ionic current intensity determined by the ionic current intensity determination means. As a result, the fluctuation in the ionic current is accurately detected, thereby enabling the change in the ionic current amount.

Also, the ionic current intensity determination means determines the ionic current intensity based on at least one of an integral value, a peak value and a generation time of the ionic current. As a result, the fluctuation of the ionic current is accurately determined, whereby the excellent knock detection status and knock control status can be securely achieved.

Also, the ionic current intensity determination means comprises ionic current intensity correction means for correcting the ionic current intensity obtained at each ignition, based on at least engine R.P.M. and load. As a result, the fluctuation of the ionic current intensity based on the engine R.P.M. and load is suppressed, whereby the accurate ionic current intensity can be detected.

Also, the ionic current intensity determination means further comprises ionic current intensity learning means for obtaining a statistical ionic current intensity as the ionic current intensity, by means of one or more learning calculation processes including at least one of a learning calculation processing that is based on an average value of the ionic current generation time, and a learning calculation processing that is based on deviation of the ionic current generation time with respect to the average value of the ionic current generation time. As a result, the ionic current intensity is determined statistically and accurately, whereby the excellent knock detection status and knock control status can be securely achieved.

Also, the ionic current intensity learning means further comprises learning conditions approval means for approving the learning calculation processing only under operating conditions which satisfy all conditions set regarding each given object, where at least the engine R.P.M. and the load are objects, to thereby approve the learning of the ionic current intensity only under the operating conditions in which the difference between the intensity and weakness of a ionic current level is clear. As a result, the ionic current intensity is accurately determined, whereby the excellent knock detection status and knock control status can be securely achieved.

Also, the ionic current intensity learning means adds the ionic current intensity at each ignition cycle, and then divides the total sum of the ionic current intensities from given ignition cycles by the given ignition cycles, thus averaging the ionic current intensity. As a result, the fluctuation of the ionic current intensity which varies at each ignition cycle is not reflected in the learned value, whereby the stable learned value of the ionic current intensity can be obtained.

Also, the knock control device for an internal combustion engine further comprises offset setting means having at least two offset maps based on the engine R.P.M. and the load which correspond to the intensity and weakness of the ionic current intensity respectively, and, based on the output from the ionic current intensity learning means, obtaining an offset value for offsetting the comparison reference value set by the comparison reference value setting means from one of the two offset maps, or setting the offset value as a value between two values obtained from the two maps, and the comparison reference value setting means obtains the comparison reference value by adding the offset value set by the offset setting means to the filter value used in the filter processing on the knock signal outputted from the knock detection means. As a result, the optimal comparison reference value can be set regardless of the ionic current intensity, whereby the excellent knock detection status and knock control status can be securely achieved.

Also, the knock control device for an internal combustion engine further comprises correction request amount correction coefficient setting means having at least two correction request amount correction coefficient maps based on the engine R.P.M. and the load corresponding to the intensity and the weakness of the ionic current intensity respectively, and, based on the output from the ionic current intensity learning means, obtaining a correction coefficient for correcting the control parameter correction request amount set by the control parameter correction request amount setting means, from one of the two correction request amount correction coefficient maps, or setting the correction coefficient as a value between two values obtained from the two maps, and the control parameter correction request amount setting means obtains, based on the knock signal outputted from the knock detection means, the appropriate correction request amount from a table storing correction request amounts to serve as reference values for each knock signal value, and multiplies the obtained correction request amount by the correction coefficient set by the correction request amount correction coefficient setting means, to obtain the control parameter correction request amount per ignition. As a result, the excellent knock detection status and knock control status can be securely achieved regardless of the ionic current intensity.

Also, the ionic current intensity determination means determines the ionic current intensity based on a waveform of the ionic current detected by the ionic current detection means, and including the misfire determination means for determining the misfire based on the determined intensity. As a result, while increasing an added value of a system, the excellent knock detection status and knock control status can be securely achieved regardless of the ionic current intensity.

Also, the learning conditions approval means does not approve learning calculation processing to be performed regarding the ionic current intensity of an ignition cycle for which the misfire determination means determined the misfire. As a result, the ionic current intensity at the time of the misfire is not reflected in the learned value, whereby the stable learned value of the ionic current intensity value can be obtained.

What is claimed is:

1. A knock control device for an internal combustion engine, comprising:

ionic current detection means for detecting an ionic current generated immediately after ignition in a combustion chamber of an internal combustion engine;

knock detection means for extracting a knock signal from the ionic current; and knock determination means for determining a knock status of the internal combustion engine based on the extracted knock signal, wherein the knock determination means includes comparison reference value setting means for comparing the knock signal outputted from the knock detection means with a filter value which has undergone filter processing; and wherein the knock control device for the internal combustion engine further comprises:

control parameter correction request amount setting means for setting a control parameter correction request amount for correcting a control parameter at least including a retardation correction amount for retarding ignition timing of each cylinder, based on the comparison reference value set by the comparison reference value setting means, and the knock signal outputted from the knock detection means;

control parameter correction means for correcting a control parameter for controlling ignition timing of an ignition device, based on the control parameter correction request amount that has been set;

ionic current intensity determination means for determining ionic current intensity of the ionic current based on an output value from the ionic current detection means; and correction means for correcting at least one of the comparison reference value and the control parameter correction request amount, based on the ionic current intensity determined by the ionic current intensity determination means.

2. A knock control device for an internal combustion engine according to claim 1, wherein the ionic current intensity determination means determines the ionic current intensity based on at least one of an integral value, a peak value and a generation time of the ionic current.

3. A knock control device for an internal combustion engine according to claim 1, wherein the ionic current intensity determination means comprises ionic current intensity correction means for correcting the ionic current intensity obtained at each ignition, based on at least engine R.P.M. and load.

4. A knock control device for an internal combustion engine according claim 1, wherein the ionic current intensity determination means further comprises ionic current intensity learning means for obtaining a statistical ionic current intensity as the ionic current intensity, by means of one or more learning calculation processes including at least one of a learning calculation processing that is based on an average value of the ionic current generation time, and a learning calculation processing that is based on deviation of the ionic current generation time with respect to the average value of the ionic current generation time.

5. A knock control device for an internal combustion engine according to claim 4, wherein the ionic current intensity learning means further comprises learning conditions approval means for approving the learning calculation processing only under operating conditions which satisfy all conditions set regarding each given object, where at least the engine R.P.M. and the load are objects.

6. A knock control device for an internal combustion engine according to claim 4, wherein the ionic current intensity learning means adds the ionic current intensity at each ignition cycle, and then divides the total sum of the ionic current intensities from given ignition cycles by the given ignition cycles, thus averaging the ionic current intensity.

7. A knock control device for an internal combustion engine according to claim 1, further comprising offset setting means having at least two offset maps based on the engine R.P.M. and the load which correspond to the intensity and weakness of the ionic current intensity respectively, and, based on the output from the ionic current intensity learning means, obtaining an offset value for offsetting the comparison reference value set by the comparison reference value setting means from one of the two offset maps, or setting the offset value as a value between two values obtained from the two maps, wherein the comparison reference value setting means obtains the comparison reference value by adding the offset value set by the offset setting means to the filter value used in the filter processing on the knock signal outputted from the knock detection means.

8. A knock control device for an internal combustion engine according to claim 1, further comprising correction request amount correction coefficient setting means having at least two correction request amount correction coefficient maps based on the engine R.P.M. and the load corresponding to the intensity and the weakness of the ionic current intensity respectively, and, based on the output from the ionic current intensity learning means, obtaining a correction coefficient for correcting the control parameter correction request amount set by the control parameter correction request amount setting means, from one of the two correction request amount correction coefficient maps, or setting the correction coefficient as a value between two values obtained from the two maps, wherein the control parameter correction request amount setting means obtains, based on the knock signal outputted from the knock detection means, an appropriate correction request amount from a table storing correction request amounts to serve as reference values for each knock signal value, and multiplies the obtained correction request amount by the correction coefficient set by the correction request amount correction coefficient setting means, to obtain the control parameter correction request amount per ignition.

9. A knock control device for an internal combustion engine according to any one of claims 1, wherein the ionic current intensity determination means includes misfire determination means for determining the ionic current intensity based on a waveform of the ionic current detected by the ionic current detection means and determining misfire based on the determined intensity.

10. A knock control device for an internal combustion engine according to claim 9, wherein the learning conditions approval means does not approve learning calculation processing to be performed regarding the ionic current intensity of an ignition cycle for which the misfire determination means determined the misfire.

* * * * *